US012639308B2

(12) United States Patent
Singh et al.

(10) Patent No.: US 12,639,308 B2
(45) Date of Patent: May 26, 2026

(54) QUERY PROCESSING DEVICE AND QUERY PROCESSING METHOD

(71) Applicant: Hitachi, Ltd., Tokyo (JP)

(72) Inventors: Divya Singh, Tokyo (JP); Toshihiko Kashiyama, Tokyo (JP); Tianben Ding, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/903,945

(22) Filed: Oct. 1, 2024

(65) Prior Publication Data

US 2025/0110958 A1    Apr. 3, 2025

(30) Foreign Application Priority Data

Oct. 2, 2023    (JP) ................................. 2023-171583

(51) Int. Cl.
G06F 16/2453          (2019.01)
(52) U.S. Cl.
CPC .. G06F 16/24542 (2019.01); G06F 16/24535 (2019.01)
(58) Field of Classification Search
None
See application file for complete search history.

(56) References Cited

U.S. PATENT DOCUMENTS

| | | | | |
|---|---|---|---|---|
| 10,049,133 | B2 * | 8/2018 | Barsness ............. | G06F 16/2455 |
| 10,664,487 | B2 * | 5/2020 | Bruce ................... | G06F 16/258 |
| 2016/0259844 | A1 * | 9/2016 | Trapeznikov ....... | G06F 16/9535 |
| 2020/0175010 | A1 * | 6/2020 | Vaghani ............. | G06F 16/2246 |
| 2021/0149903 | A1 * | 5/2021 | Won ................. | G06F 16/24535 |

FOREIGN PATENT DOCUMENTS

JP          2022137857 A          9/2022

* cited by examiner

*Primary Examiner* — Son T Hoang
(74) *Attorney, Agent, or Firm* — MATTINGLY & MALUR, PC

(57)          ABSTRACT
A query processing device that reduces the calculation cost for checking whether a query complies with restrictions. A query dividing section generates subqueries by dividing an input query for each of a plurality of organizations. A score computing section computes an organization score by evaluating an organization-specific risk that is the risk of determination that the subquery does not comply with organization rules of the organization corresponding to the subquery, on the basis of history information relating to a determination track record resulting from determining, regarding each organization, whether or not the input query complies with the organization rules of each organization. A subquery control section sequentially transmits the subqueries to rule check devices in transmission order according to the organization score, and response information is received regarding the subquery from the rule check devices. Whether the input query complies with restrictions is determined by using the response information.

9 Claims, 11 Drawing Sheets

| HOSPITAL | ORGANIZATION SCORE |
|----------|--------------------|
| H2 | 0.9 |
| H3 | 0.8 |
| H1 | 0.6 |
| H4 | 0.2 |

803

803

800 RANK INFORMATION

QUERY PROCESSING DEVICE AND QUERY PROCESSING METHOD

CROSS-REFERENCE TO RELATED APPLICATION

The present application claims priority from Japanese application JP2023-171583, filed on Oct. 2, 2023, the content of which is hereby incorporated by reference into this application.

BACKGROUND OF THE INVENTION

1. Field of the Invention

The present disclosure relates to a query processing device and a query processing method.

2. Description of the Related Art

A data collection technique for collecting and analyzing various kinds of data is important for understanding the current situation and predicting the future, and is used for data-driven decision making and the like. However, for use of data, there is a need to comply with restrictions imposed on the data.

JP-2022-137857-A (hereinafter, Patent Document 1) discloses a technique in which whether or not a query from a user complies with restrictions imposed on data stored in a database is determined when operation according to the query is executed on the data. In this technique, statistical information as exemplified by a k-value regarding data generated by the operation according to the query is estimated from the original data in the database, and whether or not the data complies with the restrictions is determined on the basis of the statistical information.

SUMMARY OF THE INVENTION

When a federated query that allows an external database managed in each of a plurality of organizations to be treated like an internal database is used as a query for operating data, there is a problem that it is often impossible for the method of estimating statistical information of data to deal with restrictions individually prescribed in each organization and thus impossible to apply the technique described in Patent Document 1.

In this case, there is a need to inquire of each organization whether or not the query complies with the restrictions individually prescribed in each organization. Thus, there is a problem that calculation resources of all organizations are used and the calculation cost for determining whether or not the query complies with the restrictions becomes high.

An object of the present disclosure is to provide a query processing device and a query processing method that can reduce the calculation cost for determining whether or not a query complies with restrictions.

A query processing device according to one aspect of the present disclosure is a query processing device that determines whether or not an input query to request operation on a plurality of pieces of data managed in each of a plurality of organizations complies with restrictions imposed on the data. The query processing device includes a dividing section that generates a plurality of subqueries obtained by dividing the input query for each of the organizations and a computing section that computes, regarding each of the organizations, an organization score obtained by evaluating an organization-specific risk that is the risk of determination that the subquery does not comply with organization rules of the organization corresponding to the subquery, on the basis of history information relating to a determination track record resulting from determining, regarding each of the organizations, whether or not the input query complies with the organization rules. The organization rules are the restrictions of each of the organizations. The query processing device includes also a subquery control section that sequentially transmits the subqueries to check devices in transmission order according to the organization score and sequentially receives response information regarding the subquery from the check devices. The check devices check whether or not the subquery complies with the organization rules of the organization corresponding to the subquery. The query processing device includes also a determining section that determines whether or not the input query complies with the restrictions, by using the response information.

According to the present invention, the calculation cost for checking whether or not a query complies with restrictions can be reduced.

BRIEF DESCRIPTION OF THE DRAWINGS

FIG. 1 is a diagram illustrating a configuration of a query processing device of one embodiment of the present disclosure;

FIG. 8 is a diagram illustrating one example of rank information;

DESCRIPTION OF THE PREFERRED EMBODIMENT

Figure 2:
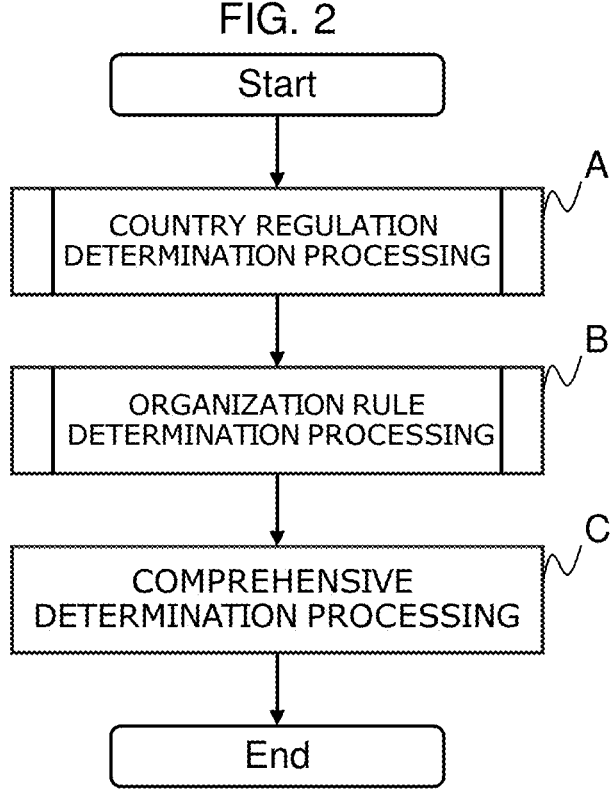
FIG. 2 is a flowchart for explaining overall processing of the query processing device of the one embodiment of the present disclosure.

An embodiment of the present disclosure will be described below with reference to the drawings.

Figure 1:
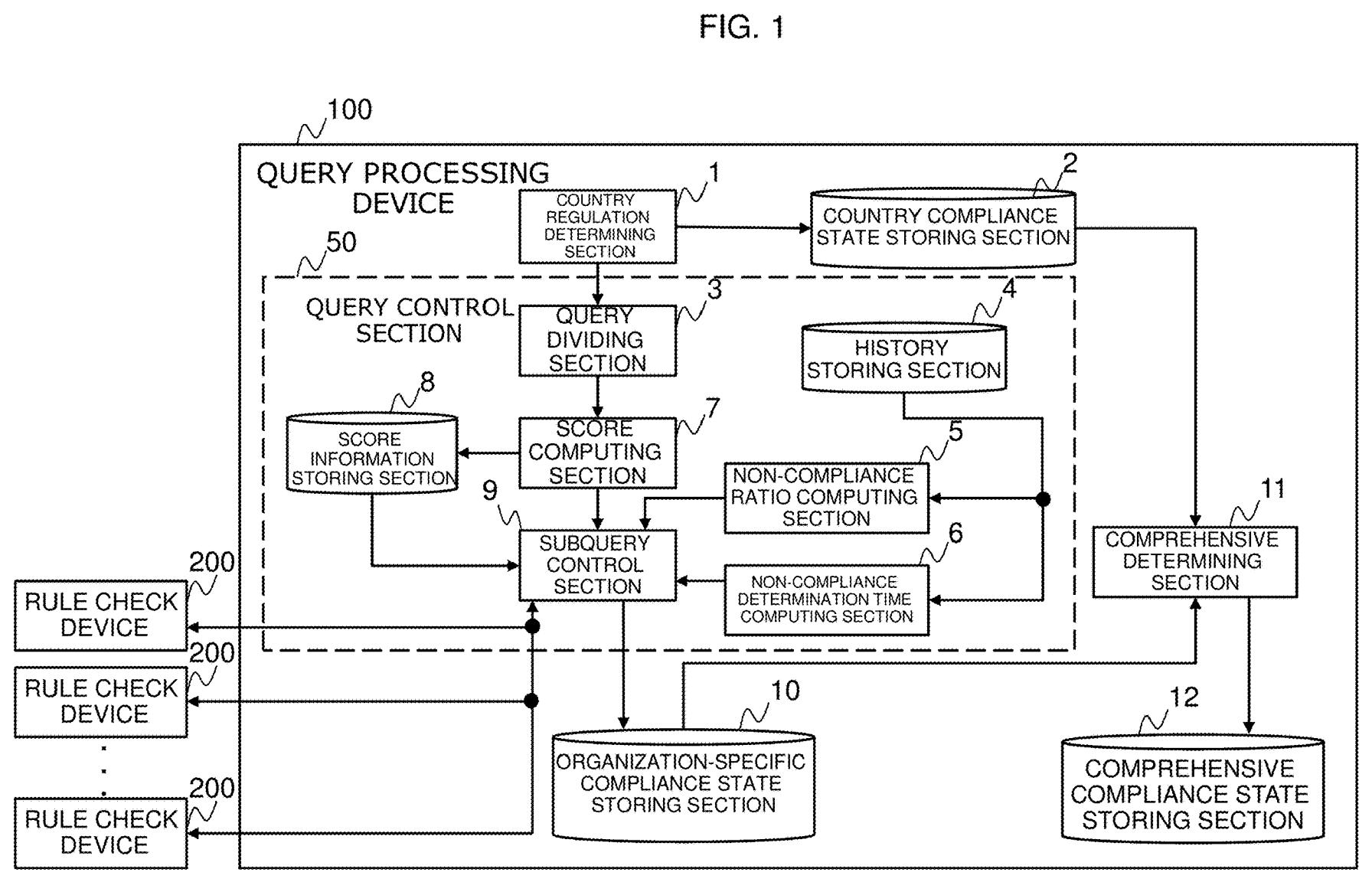

FIG. 1 is a diagram illustrating a configuration of a query processing device of one embodiment of the present disclosure. A query processing device 100 illustrated in FIG. 1 is a device that executes a compliance check to determine whether or not an input query that is a query to request operation on data complies with (keeps compliance with) restrictions imposed on the data. The compliance check includes a country regulation check to determine whether or not the input query complies with regulations of subject countries that treat the data and an organization rule check to determine whether or not the input query complies with organization rules prescribed in an organization that manages the data. The organization is, for example, a hospital but is not limited to this example.

Specifically, the query processing device 100 has a country regulation determining section 1, a country compliance state storing section 2, a history storing section 4, a non-compliance ratio computing section 5, a non-compliance determination time computing section 6, a query dividing section 3, a score computing section 7, a score information storing section 8, a subquery control section 9, an organization-specific compliance state storing section 10, a comprehensive determining section 11, and a comprehensive compliance state storing section 12.

The country regulation determining section 1 executes the country regulation check to determine whether or not an input query complies with country regulations that are regulations of subject countries. In the present embodiment, the input query is a federated query that allows an external database managed in each organization to be treated as an internal database. However, the input query is not limited thereto. The country regulation check is implemented by a data flow check using a data flow policy in which data that permits or prohibits data transfer in a country or between a plurality of countries is described. The subject countries are the country of transfer source of the data and the country of transfer destination of the data. When data transfer in a country is executed, the country of transfer source and the country of transfer destination correspond with each other.

The country compliance state storing section 2 stores country compliance state information indicating the determination result obtained by the country regulation determining section 1 (that is, whether or not the input query complies with the country regulations). Here, the country compliance state information indicates "Compliant" when the input query complies with the country regulations, and indicates "Non-compliant" when the input query does not comply with the country regulations.

The query dividing section 3, the history storing section 4, the non-compliance ratio computing section 5, the non-compliance determination time computing section 6, the score computing section 7, the score information storing section 8, and the subquery control section 9 configure a query control section 50 that executes the organization rule check to determine whether or not the input query complies with organization rules of each organization.

The query dividing section 3 divides the input query into a plurality of subqueries to request operation on data of the respective organizations.

The history storing section 4, the non-compliance ratio computing section 5, the non-compliance determination time computing section 6, and the score computing section 7 configure a computing section that computes an organization score obtained by evaluating an organization-specific risk that is the risk of determination that the subquery arising from dividing by the query dividing section 3 does not comply with the organization rules. Note that the organization score is computed for each organization.

The history storing section 4 stores, regarding each organization that manages data, history information relating to the determination track record of the organization rule check resulting from determining whether or not the subquery to request operation on the data of the organization complies with the organization rules prescribed in the organization. The organization rules include individual rules regarding each piece of source data as data that becomes the subject of operation requested by the subquery. In the present embodiment, each data in a database managed in the organization is table data, and the source data is a column of the table data. However, the data is not limited to this example.

The non-compliance ratio computing section 5 computes, regarding each organization, the ratio of determination that the subquery corresponding to the organization does not comply with the organization rules, as the non-compliance ratio, on the basis of the history information stored in the history storing section 4. More specifically, regarding each of the individual rules included in the organization rules, the non-compliance ratio computing section 5 computes, as the non-compliance ratio, the ratio of determination that the subquery does not comply with the individual rule with respect to the number of times the column corresponding to the individual rule has become the subject of operation by the subquery.

The non-compliance determination time computing section 6 computes, regarding each organization, the time required to determine that the subquery is a non-compliant query that does not comply with the organization rules, as the non-compliance determination time, on the basis of the history information stored in the history storing section 4. Specifically, the non-compliance determination time is a statistical value (for example, average or the like) of the past required time. For example, the non-compliance determination time differs depending on the type of database used in the organization, and so forth. For example, when the organization is a hospital, the non-compliance determination time differs depending on whether the database is the National Data Base (NDB: information database of specific health checkup and the like) or the Kokuho Data Base (KDB: National Health Insurance database).

The score computing section 7 computes, regarding each organization, the organization score obtained by evaluating the organization-specific risk that is the risk of determination that the subquery generated in the query dividing section 3 does not comply with the organization rules, on the basis of the non-compliance ratio of each organization computed in the non-compliance ratio computing section 5 and the non-compliance determination time of each organization computed in the non-compliance determination time computing section 6. Further, the score computing section 7 computes a query score obtained by evaluating the risk of determination that the input query does not comply with the organization rules, on the basis of the non-compliance ratio of each organization computed in the non-compliance ratio computing section 5.

The score information storing section 8 stores the query score and the organization score computed in the score computing section 7.

The subquery control section 9 decides the transmission system of the subqueries on the basis of the query score stored in the score information storing section 8, and transmits the subqueries in accordance with the transmission system. The transmission system includes a parallel transmission system to collectively transmit all subqueries and a sequence transmission system to sequentially transmit the subqueries in the order of transmission according to the organization score of each organization.

Here, the transmission destination of the subquery is a rule check device 200 that is a server disposed in each organization. When receiving the subquery, the rule check device 200 of each organization checks whether or not the subquery complies with the organization rules of its own organization, and returns the check result to the query processing device 100 as response information.

The organization-specific compliance state storing section 10 stores organization-specific compliance state information indicating the response information from the rule check device 200 (that is, whether or not the subquery complies with the organization rules) regarding each organization. Here, regarding each organization, the organization-specific compliance state information indicates "Compliant" when the subquery complies with the organization rules, and indicates "Non-compliant" when the subquery does not comply with the organization rules.

The comprehensive determining section 11 determines whether or not the input query complies with the restrictions, on the basis of the country compliance state information stored in the country compliance state storing section 2 and the organization-specific compliance state information stored in the organization-specific compliance state storing section 10. Specifically, the comprehensive determining section 11 determines that the input query complies with the restrictions when the country compliance state information indicates "Compliant" and the organization-specific compliance state information indicates "Compliant" regarding all organizations. In the other cases, the comprehensive determining section 11 determines that the input query does not comply with the restrictions.

The comprehensive compliance state storing section 12 stores comprehensive compliance state information indicating the determination result obtained by the comprehensive determining section 11 (that is, whether or not the input query complies with the restrictions). Note that the comprehensive compliance state information may be output to the transmission source of the input query, or the like.

FIG. 2 is a flowchart for explaining overall processing of the query processing device 100.

In the overall processing, first, the country regulation determining section 1 executes country regulation determination processing (see FIG. 3) of executing the country regulation check to determine whether or not an input query complies with country regulations and storing the country compliance state information indicating the determination result in the country compliance state storing section 2 (step A).

Subsequently, the query control section 50 executes organization rule determination processing (see FIG. 5) of executing the organization rule check to determine whether or not the input query complies with the organization rules of each organization and storing the organization-specific compliance state information indicating the determination result (step B).

Then, the comprehensive determining section 11 executes comprehensive determination processing of determining whether or not the input query complies with restrictions, on the basis of the country compliance state information and the organization-specific compliance state information, and storing the comprehensive compliance state information indicating the determination result in the comprehensive compliance state storing section 12 (step C), and ends the processing.

Figure 3:
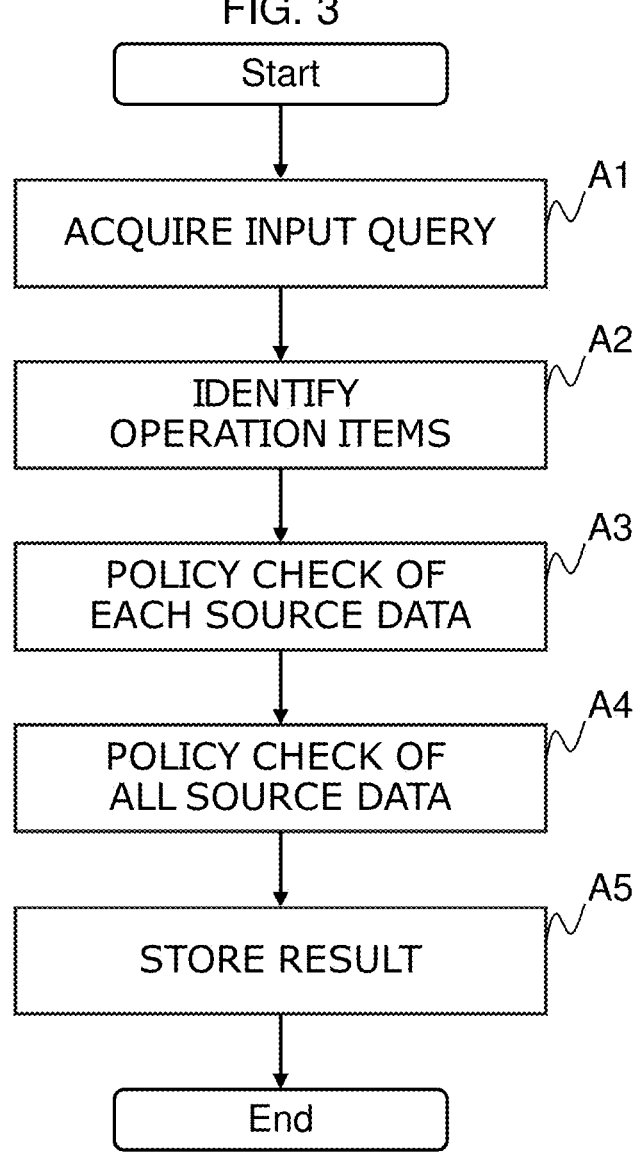
FIG. 3 is a flowchart for explaining one example of country regulation determination processing.

FIG. 3 is a flowchart for explaining one example of the country regulation determination processing of step A in FIG. 2.

In the country regulation determination processing, first, the country regulation determining section 1 acquires the input query (step A1). For example, the country regulation determining section 1 acquires the input query transmitted from an external device as exemplified by a client terminal operated by a user who uses the query processing device 100.

The country regulation determining section 1 analyzes (parses) the input query by using a structured query language (SQL) parser and identifies operation items relating to operation requested by the input query (step A2). The operation items include operation subject information for identifying source data that becomes the subject of operation requested by the input query, the country of transfer source of the source data, the country of transfer destination of the source data, whether or not aggregation of the source data is necessary, whether or not masking of the source data is necessary, and so forth. In the present embodiment, the source data is the column as described above, and the operation subject information includes, for example, a value to identify the column (column name or the like), a value to identify the table having the column (table name or the like), and a value to identify the organization that manages the table. The value to identify the organization may be a location value indicating the location of the organization, or the like.

The country regulation determining section 1 determines, regarding each source data, whether or not the source data complies with the data flow policy, on the basis of the operation items (step A3). For example, in the case in which the data flow policy describes data that permits data transfer, the country regulation determining section 1 determines that the source data complies with the data flow policy when the respective operation items (operation subject information, country of transfer source, country of transfer destination, whether or not aggregation is necessary, and whether or not masking is necessary) are all described in the data flow policy.

The country regulation determining section 1 determines whether or not the input query complies with the country regulations, on the basis of the determination result regarding each source data by the processing of step A3 (step A4). Specifically, the country regulation determining section 1 determines that the input query complies with the country regulations when all pieces of source data comply with the data flow policy, and determines that the input query does not comply with the country regulations in the other cases.

Further, the country regulation determining section 1 generates the country compliance state information indicating the determination result of step A4, stores it in the country compliance state storing section 2 (step A5), and ends the processing.

When the country compliance state information has become "Non-compliant" in the above-described processing, the comprehensive compliance state information becomes "Non-compliant" in the comprehensive determination processing of step C irrespective of the processing result of the organization rule determination processing of step B in FIG. 2. Thus, the processing of step B may be skipped when the country compliance state information becomes "Non-compliant."

Figure 4:
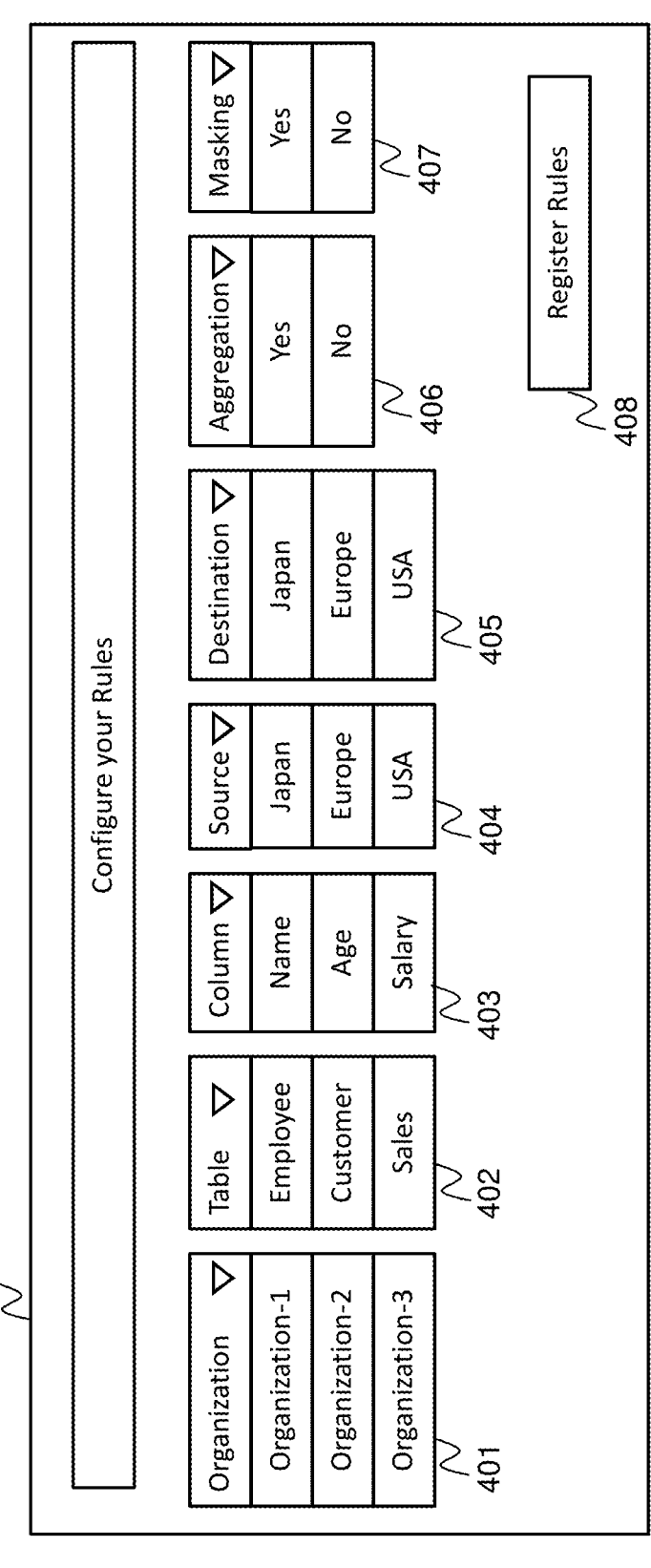
FIG. 4 is a diagram illustrating one example of a policy setting screen.

The data flow policy used in step A3 is set in advance by an administrator of the query processing device 100, or the like. FIG. 4 is a diagram illustrating one example of a policy setting screen for setting the data flow policy. A policy setting screen 400 illustrated in FIG. 4 has interfaces 401 to 407 for setting the item values of the respective items (organization, table, column, country of transfer source, country of transfer destination, whether or not aggregation is necessary, and whether or not masking is necessary) of the data flow policy and an enter button 408 for settling the item values set by the interfaces 401 to 407 as the data flow policy.

Figure 5:
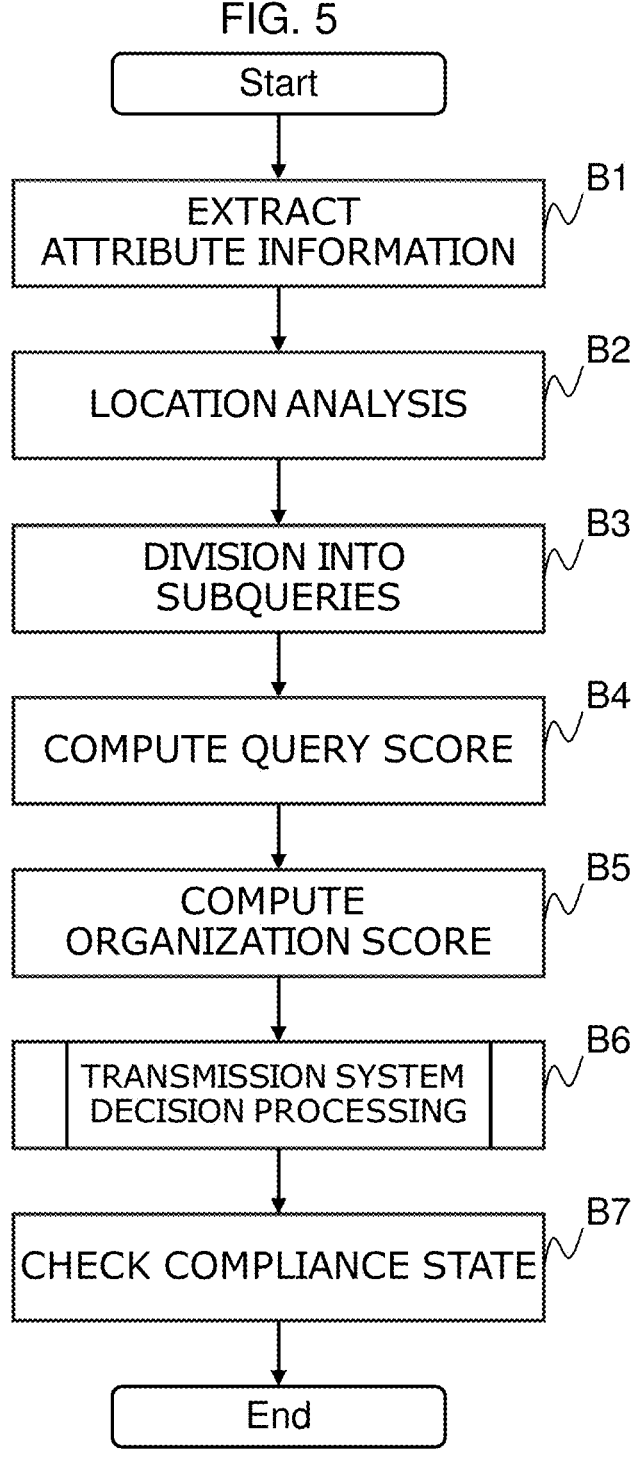
FIG. 5 is a flowchart for explaining one example of organization rule determination processing.

FIG. 5 is a flowchart for explaining one example of the organization rule determination processing of step B in FIG. 2.

In the organization rule determination processing, first, the query dividing section 3 analyzes the input query by using an SQL parser and extracts attribute information of the input query from the input query (step B1). The attribute information of the input query includes the operation subject information.

The query dividing section 3 executes location analysis to identify the correspondence relation between the location of the organization and the source data, on the basis of a location table indicating the correspondence relation between the location of the organization and data managed in the organization and the attribute information extracted in step B1 (step B2).

The query dividing section 3 divides the input query into subqueries of each organization on the basis of the analysis result of the location analysis (step B3).

Figure 6:
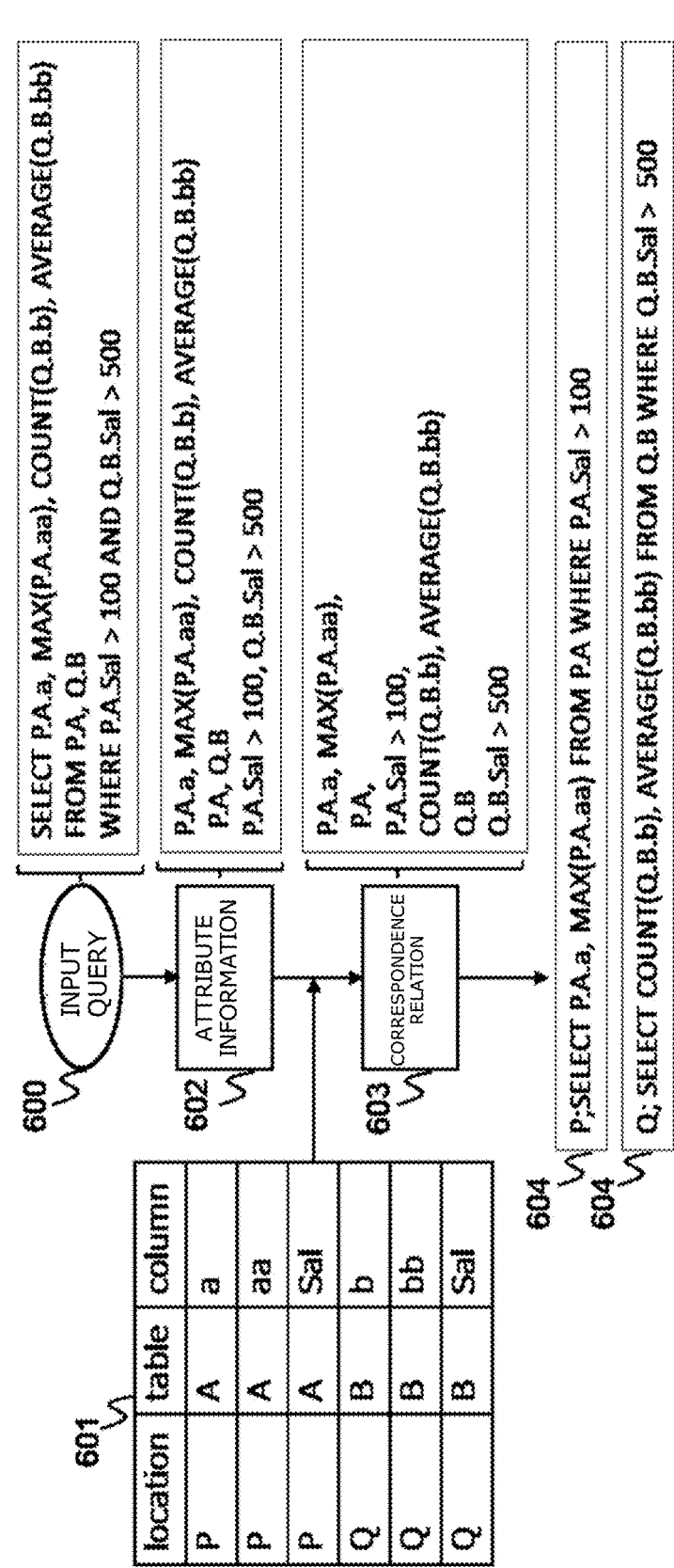
FIG. 6 is a diagram for explaining one example of subquery generation processing.

FIG. 6 is a diagram for explaining one example of subquery generation processing to generate the subqueries in steps B1 to B3. In the example of FIG. 6, a federated query 600 including a SELECT sentence as an input query and a location table 601 are illustrated. Variables of the SELECT sentence as the attribute information of the federated query 600 include information for identifying the organization that manages source data, the column that is the source data, and the table having the column. Specifically, in FIG. 6, character strings P and Q included in the variables are location values indicating the location of the organization. A and B are table values indicating the table, and a, aa, Sal, b, and bb are column values indicating the column. The location table 601 indicates the correspondence relation between the character strings P and Q indicating the location of the organization, the character strings A and B indicating the table managed in the organization, and the character strings a, aa, Sal, b, and bb indicating the column of the table.

In step B1, the attribute information 602 is extracted from the federated query 600. In step B2, a correspondence relation 603 between the location of the organization and the attribute information is identified on the basis of the location table 601 and the attribute information 602. Further, in step B3, the federated query 600 is divided into subqueries 604 regarding each location of the organization, on the basis of the correspondence relation 603.

Described with reference to FIG. 5 again, the score computing section 7 executes query score computation processing of computing the query score regarding the input query on the basis of the non-compliance ratio of each organization computed in the non-compliance ratio computing section 5, and stores the query score in the score information storing section 8 (step B4).

Figure 7:
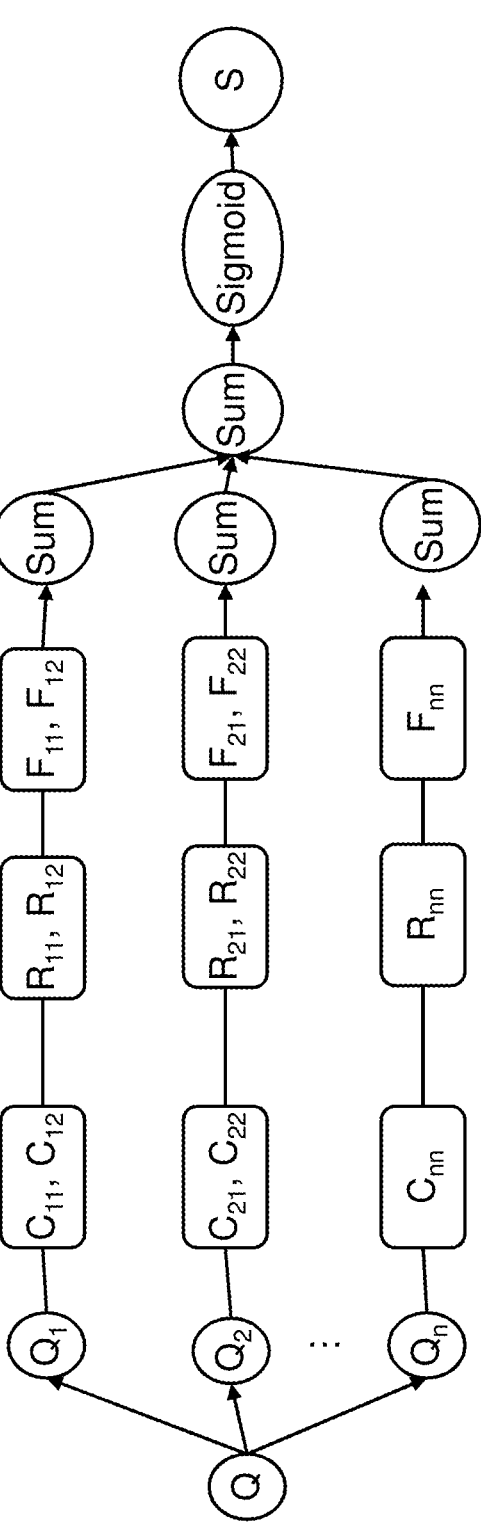
FIG. 7 is a diagram for explaining one example of query score computation processing.

FIG. 7 is a diagram for explaining one example of the query score computation processing to compute the query score in step B4.

As illustrated in FIG. 7, in the query score computation processing, first, the score computing section 7 identifies one or more columns Cij that become the subject of operation of each of a plurality of subqueries Qi (i=1 to n) generated from an input query (Q). Then, the score computing section 7 acquires, from the non-compliance ratio computing section 5, non-compliance ratios Fij at which operation requested by the subquery Qi does not comply with an individual rule Rij that is the organization rule regarding each column Cij, and computes a value obtained by applying a sigmoid function to the sum of them, as a query score S. Here, a suffix i allows identification of the organization, and a suffix j allows identification of one or more columns that become the operation subject of the subquery corresponding to the same organization.

Described with reference to FIG. 5 again, the score computing section 7 executes computation processing of computing the organization score of each organization on the basis of the non-compliance ratio computed in the non-compliance ratio computing section 5 and the non-compliance determination time computed in the non-compliance determination time computing section 6, and stores the organization score in the score information storing section 8 (step B5).

In the computation processing of the organization score, for example, regarding each organization, the score computing section 7 computes, as the organization score, a value obtained by applying a sigmoid function to a value (gi×hi) obtained by multiplying a non-compliance determination time gi corresponding to the organization by a sum hi of the non-compliance ratios Fij regarding the individual rules Rij included in the organization rules of the organization.

Further, the score computing section 7 stores the organization scores in the score information storing section 8 as rank information in which the organizations are lined up in descending order of the organization score.

FIG. 8 is a diagram illustrating one example of the rank information indicating the organization scores. Rank information 800 illustrated in FIG. 8 includes fields 801 and 802. The field 801 stores the hospital name as identification information for identifying the hospital as one example of the organization. The field 802 stores the organization score regarding the hospital. Moreover, in the rank information 800, the respective records 803 are sorted in descending order of the organization score.

Described with reference to FIG. 5 again, the subquery control section 9 executes transmission system decision processing (see FIG. 9) of deciding the transmission system of the subquery to each organization on the basis of the query score stored in the score information storing section 8 (step B6).

The subquery control section 9 transmits the subqueries to the rule check devices 200 of the respective organizations on the basis of the decided transmission system. Thereafter, the subquery control section 9 receives, from the rule check device 200, the response information that is the check result indicating whether or not the subquery complies with the organization rules, stores the response information in the organization-specific compliance state storing section 10 as the organization-specific compliance state information (step B7), and ends the processing.

In step B7, when the transmission system is the sequence transmission system, the subquery control section 9 sequentially transmits the subqueries in the transmission order according to the rank information stored in the score information storing section 8. At this time, when receiving the response information regarding the immediately previous subquery, the subquery control section 9 transmits the next subquery. In this case, when non-compliance response information indicating "Non-compliant" is received as the response information, the comprehensive compliance state information becomes "Non-compliant" in the comprehensive determination processing of step C in FIG. 2 irrespective of the contents of the response information received from other organizations. Hence, the subquery control section 9 may stop transmission of the subsequent subqueries.

Figure 9:
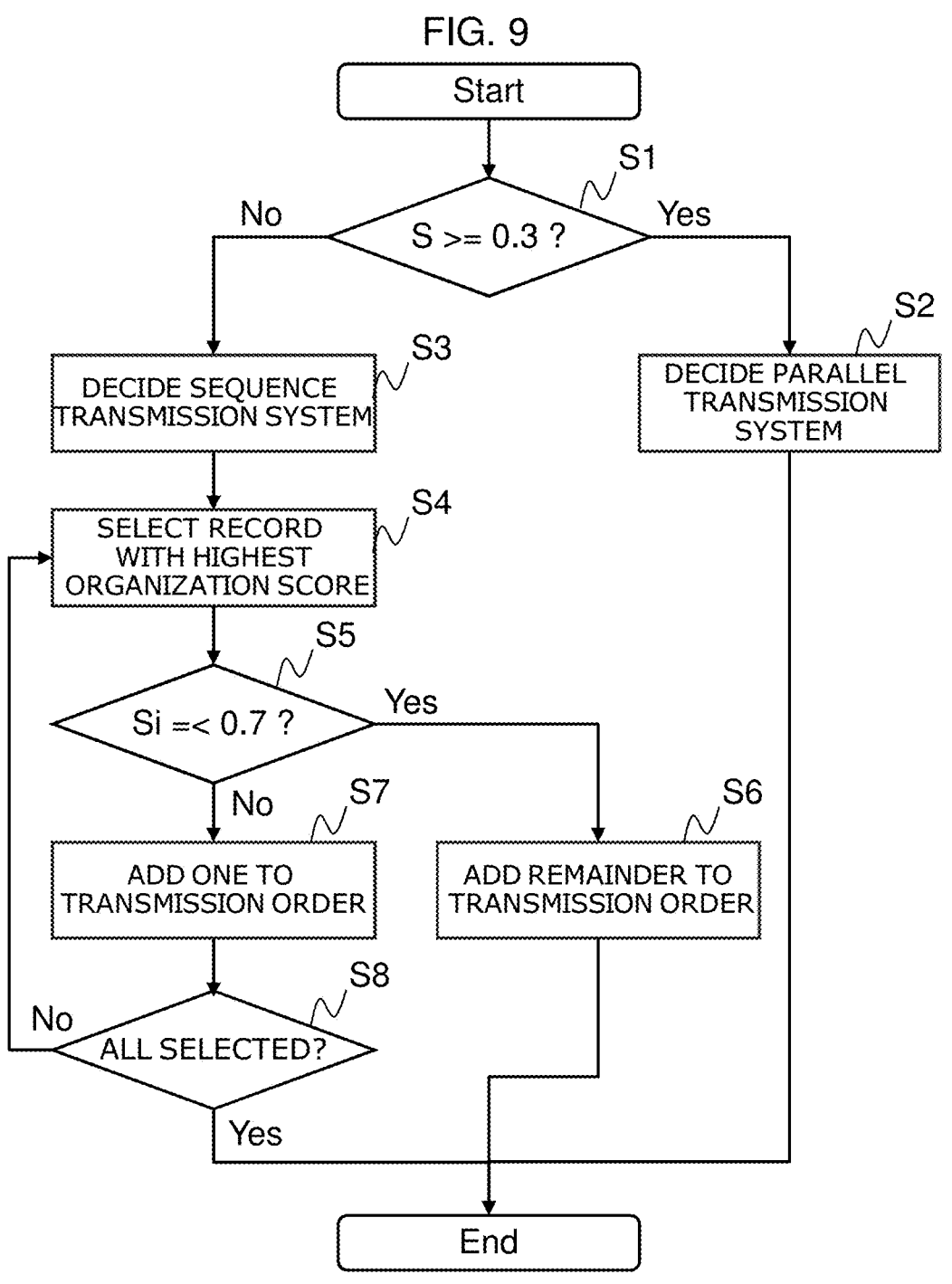
FIG. 9 is a flowchart for explaining one example of transmission system decision processing.

FIG. 9 is a flowchart for explaining one example of the transmission system decision processing of step B6.

In the transmission system decision processing, first, the subquery control section 9 determines whether or not the query score S of an input query is equal to or lower than a first threshold (step S1). In the example of FIG. 9, the first threshold is set to 0.3 but is not limited to this example. Note that, in the present embodiment, the risk of determination that the input query does not comply with the organization rules is higher when the query score S is higher. Hence, the state in which the query score S is equal to or lower than the first threshold corresponds to the state in which the risk is equal to or lower than the predetermined criterion.

When the query score is higher than the first threshold (step S1: No), the subquery control section 9 decides the parallel transmission system as the transmission system (step S2), and ends the processing.

On the other hand, when the query score is equal to or lower than the first threshold (step S1: Yes), the subquery control section 9 decides the sequence transmission system as the transmission system (step S3). Then, the subquery control section 9 selects, from the rank information, the record with the highest organization score among the records that have not been selected, as the subject record (step S4).

The subquery control section 9 determines whether or not an organization score $S_i$ of the subject record is equal to or lower than a second threshold (step S5). In the example of FIG. 9, the second threshold is set to 0.7 but is not limited to this example. Note that, in the present embodiment, the risk of determination that the subquery does not comply with the organization rules is higher when the organization score $S_i$ is higher. Hence, the state in which the organization score $S_i$ is equal to or lower than the second threshold corresponds to the state in which the risk is equal to or lower than the predetermined criterion.

When the organization score is higher than the second threshold (step S5: No), the subquery control section 9 adds the organization of the subject record to the tail end of the transmission order list indicating the transmission order of the subqueries (step S7). Then, the subquery control section 9 determines whether or not all organizations have been added to the transmission order list (step S8). When all organizations have not been added (step S8: No), the subquery control section 9 returns to the processing of step S4. When all organizations have been added (step S8: Yes), the subquery control section 9 ends the processing.

Further, when the organization score is equal to or lower than the second threshold (step S5: Yes), the subquery control section 9 collectively adds the remaining organizations to the tail end of the transmission order list (step S6), and ends the processing.

Through the above processing, when the transmission system is the sequence transmission system, in the transmission order list, the organizations regarding which the organization-specific risk is higher than the predetermined criterion line up in descending order of the organization-specific risk, and subsequently, the organizations regarding which the organization-specific risk is lower than the predetermined criterion are stored with the same transmission order. Thus, the subquery control section 9 transmits high-prediction subqueries that are the subqueries corresponding to the organizations regarding which the organization-specific risk is higher than the predetermined criterion in descending order of the organization-specific risk, and collectively transmits the subqueries corresponding to the organizations regarding which the organization-specific risk is equal to or lower than the criterion after the transmission of the high-prediction subqueries.

Figure 10:
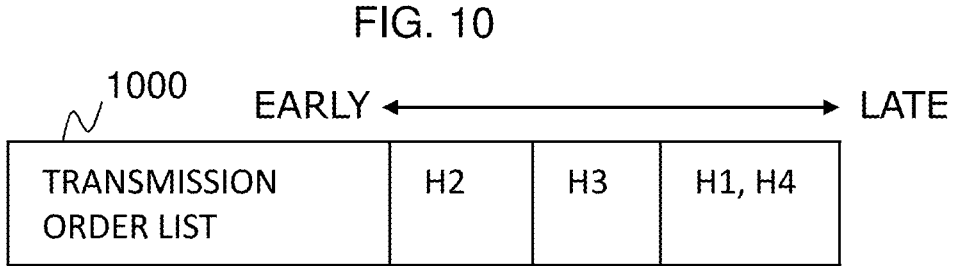
FIG. 10 is a diagram illustrating one example of a transmission order list.

FIG. 10 is a diagram illustrating one example of the transmission order list. In a transmission order list 1000 illustrated in FIG. 10, organizations are lined up in the transmission order of the subqueries corresponding to the organizations from the earlier side, and a plurality of organizations added in step S6 are stored at the end with the same transmission order.

Figure 11:
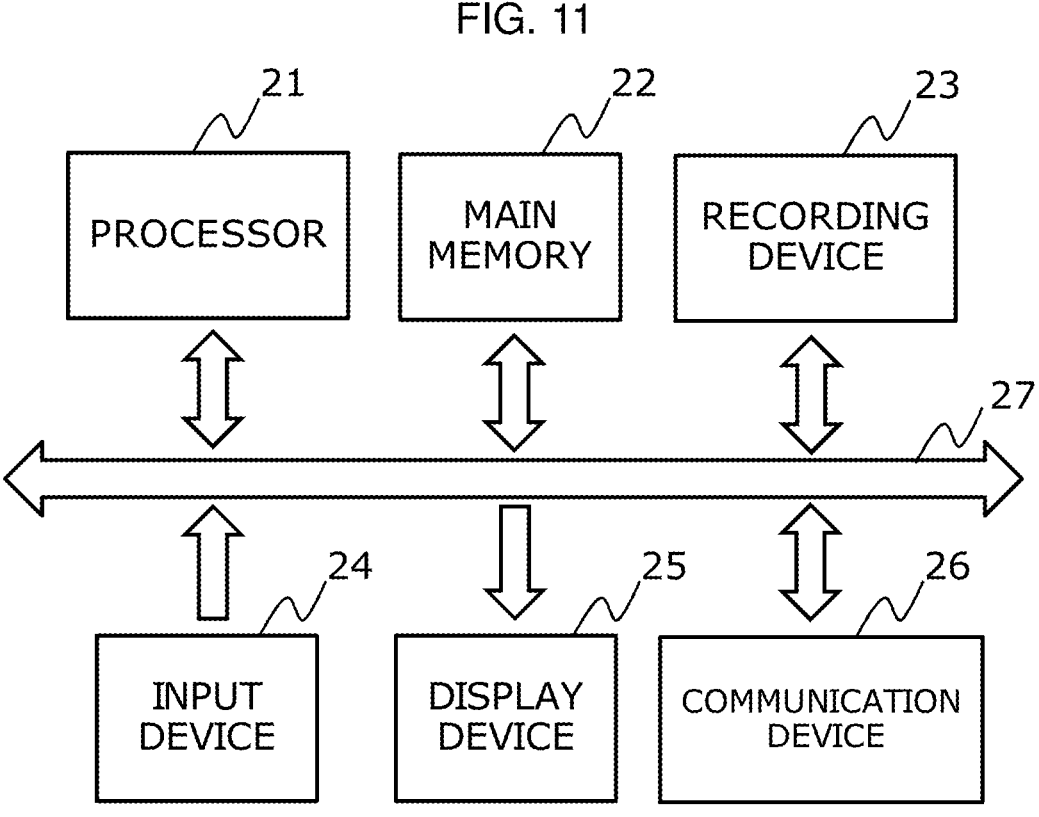
FIG. 11 is a diagram illustrating a hardware configuration of the query processing device of the one embodiment of the present disclosure.

FIG. 11 is a diagram illustrating a hardware configuration of the query processing device 100.

As illustrated in FIG. 11, the query processing device 100 is implemented by a computer system having a processor 21, a main memory 22, a recording device 23, an input device 24, a display device 25, and a communication device 26 connected to each other via a bus 27.

The recording device 23 is a device that records data in such a manner that the data can be written and read out, and records a program that defines operation of the processor 21 and various pieces of information generated and used by the program. For example, the recording device 23 stores the history information, the country compliance state information, the organization-specific compliance state information, the comprehensive compliance state information, the query score, the organization score, and the like.

The processor 21 is, for example, a central processing unit (CPU), and is a control section that reads out the program recorded in the recording device 23 into the main memory 22 and executes processing according to the program by using the main memory 22. The respective configurations illustrated in FIG. 1 and functions of them are implemented by the processor 21. The input device 24 is a device to which various pieces of information are input from an operator of the query processing device 100, and the pieces of information are used for processing of the processor 21. The display device 25 is a device that displays various pieces of information. The communication device 26 executes communication with other devices (transmission source of an input query, the rule check device 200, and the like) to execute transmission and reception of various pieces of information.

Note that at least part of the processing by the processor 21 may be implemented by a hardware circuit (for example, an application specific integrated circuit (ASIC), a field-programmable gate array (FPGA), or the like).

As described above, according to the present embodiment, the query dividing section 3 generates a plurality of subqueries obtained by dividing an input query for each organization. The score computing section 7 computes, regarding each organization, the organization score obtained by evaluating the organization-specific risk that is the risk of determination that the subquery does not comply with the organization rules of the organization corresponding to the subquery, on the basis of the history information relating to the determination track record resulting from determining, regarding each organization, whether or not the input query complies with the organization rules of each organization. The subquery control section 9 sequentially transmits the subqueries to the rule check devices 200 in the transmission order according to the organization score, and sequentially receives the response information regarding the subquery from the rule check devices 200. The comprehensive determining section 11 determines whether or not the input query complies with the restrictions by using the response information.

Accordingly, it becomes possible to cause determination of whether or not the subquery complies with the organization rules in descending order of the risk of determination that the subquery does not comply with the organization rules. Thus, it becomes possible to suppress determination of the unnecessary subquery. Consequently, it becomes possible to reduce the calculation cost for determining whether or not the query complies with the restrictions.

Further, in the present embodiment, the subquery control section 9 stops transmission of the subquery when receiving the non-compliance response information indicating that the subquery does not comply with the organization rules. The comprehensive determining section 11 determines that the input query does not comply with the restrictions when the non-compliance response information is received. In this case, it becomes possible to more appropriately reduce the calculation cost for determining whether or not the query complies with the restrictions.

Moreover, in the present embodiment, the score computing section 7 computes, regarding each organization, the non-compliance determination time required to determine that the input query does not comply with the organization rules and the non-compliance ratio at which the input query is determined not comply with the organization rules, on the basis of the history information, and computes the organization score on the basis of the non-compliance determination time and the non-compliance ratio. In this case, it becomes possible to more appropriately reduce the calculation cost for determining whether or not the query complies with the restrictions.

Further, in the present embodiment, the subquery control section 9 transmits the high-prediction subqueries that are the subqueries corresponding to the organizations regarding which the organization-specific risk is higher than the predetermined criterion in descending order of the organization-specific risk, and collectively transmits the subqueries corresponding to the organizations regarding which the organization-specific risk is equal to or lower than the criterion after the transmission of the high-prediction subqueries. In this case, it becomes possible to collectively transmit the subqueries that are less likely to be determined not to comply with the organization rules after the transmission of the subqueries that are highly likely to be determined not to comply with the organization rules. Thus, it becomes possible to reduce the calculation cost and suppress increase in the calculation time for determining whether or not the query complies with the restrictions.

Moreover, in the present embodiment, the score computing section 7 computes the query score obtained by evaluating the overall risk that is the risk of determination that the input query does not comply with the restrictions, on the basis of the history information. On the basis of the query score, the subquery control section 9 sequentially transmits the subqueries in the transmission order when the overall risk is equal to or lower than the predetermined criterion, and collectively transmits the subqueries when the overall risk is higher than the criterion. In this case, it becomes possible to collectively transmit the subqueries when the risk of determination that the input query complies with the restrictions is low. Thus, it becomes possible to suppress increase in the calculation time for determining whether or not the query complies with the restrictions while reducing the calculation cost.

Further, in the present embodiment, the score computing section 7 computes, regarding each of the organizations, the ratio of determination that the subquery does not comply with the individual rule regarding each of the individual rules that are the organization rules corresponding to data that becomes the subject of operation requested by the subquery, on the basis of the history information, and computes the query score on the basis of the sum of the respective ratios. In this case, it becomes possible to allow the query score to become a value resulting from appropriate evaluation of the overall risk.

Moreover, in the present embodiment, the attribute information that specifies data that becomes the subject of operation in the input query includes the location value representing the location at which the organization is set. The query dividing section 3 divides the input query into the subqueries on the basis of the location value. In this case, it becomes possible to appropriately generate the subqueries.

The country regulation determining section 1 determines whether or not the input query complies with the country regulations that are the restrictions prescribed in the subject countries in relation to the data. The comprehensive determining section 11 determines whether or not the input query complies with the restrictions by further using the determination result obtained by the country regulation determining section 1. In this case, it is possible to deal with also the restrictions prescribed by the country separately from the organization.

The above-described embodiment of the present disclosure is an exemplification for explanation of the present disclosure and does not intend to limit the scope of the present disclosure to only this embodiment. Those skilled in the art can carry out the present disclosure in other various modes without departing from the scope of the present disclosure.

What is claimed is:

1. A query processing device that determines whether or not an input query to request operation on a plurality of pieces of data managed in each of a plurality of organizations complies with restrictions imposed on the plurality of pieces of data, the query processing device comprising:

a processor; and a memory storing instructions that when executed by the processor configure the processor to:

generate a plurality of subqueries obtained by dividing the input query for each of the organizations, each of the plurality of subqueries corresponds to each of the organizations;

compute, regarding each of the organizations, an organization score obtained by evaluating an organization-specific risk that the subquery does not comply with organization rules of the organization corresponding to the subquery based on history information relating to a determination track record resulting from determining, regarding each of the organizations, whether or not the input query complies with the organization rules, the organization rules being the restrictions of each of the organizations;

sequentially transmit the plurality of subqueries to check devices in a transmission order according to the organization scores and sequentially receive response information regarding the plurality of subqueries from the check devices, the check devices checking whether each subquery of the plurality of subqueries complies with the organization rules of the organization corresponding to the subquery;

upon receiving response information indicating that a respective subquery does not comply with the organization rules, stop transmission of any subqueries subsequent to the respective subquery; and determine whether the input query complies with the restrictions, by using the response information.

2. The query processing device according to claim 1, wherein the processor is configured to:

stop transmission of the respective subquery when receiving non-compliance response indicating that the respective subquery does not comply with the organization rules, as the response information, and determine that the input query does not comply with the restrictions when the non-compliance response information is received.

3. The query processing device according to claim 1, wherein the processor is configured to:

compute, regarding each of the organizations, a required time taken to determine that the subquery corresponding to the organization does not comply with the organization rules and a ratio of determination that the subquery corresponding to the organization does not comply with the organization rules, based on the history information, and compute the organization score based on the required time and the ratio of determination.

4. The query processing device according to claim 1, wherein, the processor is configured to:

based on the organization scores, sequentially transmit high-prediction subqueries that are subqueries corresponding to the organizations regarding which the organization-specific risk is higher than a predetermined criterion in descending order of the organization-specific risk, and collectively transmit subqueries corresponding to the organizations regarding which the organization-specific risk is equal to or lower than the predetermined criterion after the transmission of the high-prediction subqueries.

5. The query processing device according to claim 1, wherein the processor is configured to:

compute a query score obtained by evaluating an overall risk that is a risk of determination that the input query does not comply with the restrictions, based on the history information, and, wherein based on the query score, the processor sequentially transmits the subqueries in the transmission order when the overall risk is equal to or lower than a predetermined criterion, and collectively transmit the plurality of subqueries when the overall risk is higher than the predetermined criterion.

6. The query processing device according to claim 5, wherein the processor is configured to:

compute, regarding each of the organizations, a ratio of determination that the subquery does not comply with an individual rule of the organization rules corresponding to data that becomes a subject of operation requested by the subquery, based on the history information, and compute the query score based on a sum of the ratios of determination.

7. The query processing device according to claim 1, wherein attribute information that specifies data that becomes a subject of operation in the input query includes a location value representing a location at which the organization is set, and wherein the processor is configured to divide the input query into the plurality of subqueries based on the location value.

8. The query processing device according to claim 1, wherein the processor is configured to:

determine a country regulation whether the input query complies with country regulations that are the restrictions prescribed in subject countries relating to the plurality of pieces of data, and wherein the processor, in the determination of whether the input query complies with the restrictions, by further using a determination result obtained by the determination of whether the input query complies with country regulations that are the restrictions prescribed in subject countries relating to the plurality of pieces of data.

9. A query processing method by a query processing device that determines whether an input query to request operation on a plurality of pieces of data managed in each of a plurality of organizations complies with restrictions imposed on the plurality of pieces of data, the query processing method comprising:

generating a plurality of subqueries obtained by dividing the input query for each of the organizations, each of the plurality of subqueries corresponds to each of the organizations;

computing, regarding each of the organizations, an organization score obtained by evaluating an organization-specific risk that the subquery does not comply with organization rules of the organization corresponding to the subquery based on history information relating to a determination track record resulting from determining, regarding each of the organizations, whether or not the input query complies with the organization rules, the organization rules being the restrictions of each of the organizations;

sequentially transmitting the plurality of subqueries to check devices in a transmission order according to the organization scores, the check devices checking whether each subquery of the plurality of subqueries complies with the organization rules of the organization corresponding to the subquery;

sequentially receiving response information regarding the plurality of subqueries from the check devices;

upon receiving response information indicating that a respective subquery does not comply with the organization rules, stopping transmission of any subqueries subsequent to the respective subquery; and determining whether the input query complies with the restrictions, by using the response information.

* * * * *